United States Patent
Chen et al.

(10) Patent No.: US 7,298,904 B2
(45) Date of Patent: Nov. 20, 2007

(54) METHOD AND APPARATUS FOR SCALING HANDWRITTEN CHARACTER INPUT FOR HANDWRITING RECOGNITION

(75) Inventors: Yen-Fu Chen, Austin, TX (US); John W. Dunsmoir, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 10/756,930

(22) Filed: Jan. 14, 2004

(65) Prior Publication Data

US 2005/0152602 A1    Jul. 14, 2005

(51) Int. Cl.
*G06K 9/00* (2006.01)
*G06K 9/18* (2006.01)

(52) U.S. Cl. ................................... 382/186
(58) Field of Classification Search ............ 382/187, 382/182, 183, 202
See application file for complete search history.

(56) References Cited

U.S. PATENT DOCUMENTS

| | | | | |
|---|---|---|---|---|
| 4,897,638 A | | 1/1990 | Kokunishi et al. ...... 345/472.3 |
| 5,329,625 A | | 7/1994 | Kannan et al. ............ 345/173 |
| 5,911,005 A | * | 6/1999 | Uchiyama .................. 382/187 |
| 6,023,529 A | * | 2/2000 | Ilan et al. .................. 382/186 |
| 6,226,403 B1 | | 5/2001 | Parthasarathy ............ 382/187 |
| 6,535,619 B1 | * | 3/2003 | Suwa et al. ................ 382/101 |
| 6,694,056 B1 | * | 2/2004 | Ito et al. ..................... 382/186 |
| 7,013,046 B2 | | 3/2006 | Kawamura et al. ........ 382/186 |
| 2002/0067854 A1 | | 6/2002 | Reintjes et al. ............ 382/199 |
| 2002/0168107 A1 | | 11/2002 | Tang et al. ................. 382/187 |
| 2003/0099398 A1 | | 5/2003 | Izumi et al. |
| 2003/0107558 A1 | | 6/2003 | Bryborn et al. ............ 382/179 |

FOREIGN PATENT DOCUMENTS

| | | |
|---|---|---|
| CN | 1302010 A | 7/2001 |
| JP | 55138172 | 10/1980 |
| JP | 57121770 | 7/1982 |
| JP | 59144983 | 8/1984 |
| JP | 63208183 | 8/1988 |
| JP | 02110796 | 4/1990 |
| JP | 06295356 | 10/1994 |
| JP | 07311817 | 11/1995 |
| JP | 08249424 | 9/1996 |
| JP | 10-143610 | 5/1998 |
| JP | 2001236466 | 8/2001 |

* cited by examiner

*Primary Examiner*—Jingge Wu
*Assistant Examiner*—Amara Abdi
(74) *Attorney, Agent, or Firm*—Duke W. Yee; David A. Mims, Jr.; Brandon G. Williams

(57) ABSTRACT

A method, computer program product, and a data processing system for scaling handwritten character input for performing handwriting recognition. A stroke parameter is derived from a handwritten character stroke and an input area is calculated in which the handwritten character stroke was supplied. The stroke parameter is scaled according to the input area.

23 Claims, 7 Drawing Sheets

| | 710 | 711 | 712 | 713 | 714 | 715 | 716 | 717 | 718 |
|---|---|---|---|---|---|---|---|---|---|
| 700 | CHARACTER NO | CHARACTER | STROKES | REFERENCE PARAMETER Set1 | REFERENCE PARAMETER Set2 | REFERENCE PARAMETER Set3 | REFERENCE PARAMETER Set4 | REFERENCE PARAMETER Set5 | AUDIO |
| 720 | 0 | 一 | 1 | L1,θ1,C1 | NULL | NULL | NULL | NULL | char0.mp3 |
| 721 | 1 | ┝ | 2 | L2,θ2,C2 | L3,θ3,C3 | NULL | NULL | NULL | char1.mp3 |
| 722 | 2 | ┯ | 2 | L4,θ4,C4 | L5,θ5,C5 | NULL | NULL | NULL | char2.mp3 |
| 723 | 3 | ┿ | 3 | L6,θ6,C6 | L7,θ7,C7 | L8,θ8,C8 | NULL | NULL | char3.mp3 |
| 724 | 4 | ┷ | 3 | L9,θ9,C9 | L10,θ10,C10 | L11,θ11,C11 | NULL | NULL | char4.mp3 |
| 725 | 5 | 中 | 5 | L12,θ12,C12 | L13,θ13,C13 | L14,θ14,C14 | L15,θ15,C15 | L16,θ16,C16 | char5.mp3 |

METHOD AND APPARATUS FOR SCALING HANDWRITTEN CHARACTER INPUT FOR HANDWRITING RECOGNITION

RELATED APPLICATIONS

The present application is related to commonly assigned and co-pending U.S. patent application Ser. No. 10/756,918 entitled "METHOD AND APPARATUS FOR PERFORMING HANDWRITING RECOGNITION BY ANALYSIS OF STROKE START AND END POINTS", filed on Jan. 14, 2004, and to commonly assigned and co-pending U.S. patent application Ser. No. 10/756,919 entitled "METHOD AND APPARATUS FOR REDUCING REFERENCE CHARACTER DICTIONARY COMPARISONS DURING HANDWRITING RECOGNITION", filed on Jan. 14, 2004, and hereby incorporated by reference.

BACKGROUND OF THE INVENTION

1. Technical Field

The present invention relates generally to an improved data processing system and in particular to a method and apparatus for performing handwriting recognition. Still more particularly, the present invention provides a method and apparatus for scaling handwritten character input for facilitating handwriting recognition.

2. Description of Related Art

In the field of handwriting recognition, various approaches have been taken by software vendors to provide more accurate recognition of handwriting samples. Written languages that have large character sets, e.g., the Chinese and Korean languages, are particularly problematic for software vendors to develop efficient handwriting recognition algorithms. The Chinese language, for example, includes thousands of characters. Accordingly, a reference character dictionary for performing handwriting recognition of the Chinese language necessarily includes thousands of entries. The data size of the characters maintained in the reference dictionary limits the efficiency for performing handwriting analysis of written Chinese characters.

Handwriting recognition solutions require sampling handwritten character strokes during input of the strokes and comparing the samples with reference characters maintained in a reference character dictionary. For example, many handwriting recognition algorithms require construction of an image, such as a bitmap, of the handwritten character for interrogation of a reference character dictionary. For languages including large character sets, thousands of comparisons may be made to identify a potential match. Such techniques are data-intensive and require large processing capacity to effectively implement a handwriting recognition algorithm.

A particular problem encountered during comparison of handwritten characters with characters of a reference character dictionary results from variations in the character size input by a user. For example, a user may write a character that consumes a majority of a capture area of the input device. Another user may write the same character at a size that only consumes a fraction of the capture area. The character data of the reference character dictionary is derived from a character set of uniform size. Thus, comparisons of handwritten characters with characters of a reference character dictionary will often result in different character matches due to variations in the character input size.

It would be advantageous to provide a handwriting recognition technique that scales character input to improve comparison results of handwritten characters with characters of a reference character dictionary. It would be further advantageous to provide a handwriting recognition technique for scaling a handwritten character stroke parameter according to an input area in which the handwritten stroke was supplied. It would still be further advantageous to rescale a handwritten stroke parameter according to a recalculated input area after entry of subsequent handwritten character strokes.

SUMMARY OF THE INVENTION

The present invention provides a method, computer program product, and a data processing system for scaling handwritten character input for performing handwriting recognition. A stroke parameter is derived from a handwritten character stroke and an input area is calculated in which the handwritten character stroke was supplied. The stroke parameter is scaled according to the input area.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
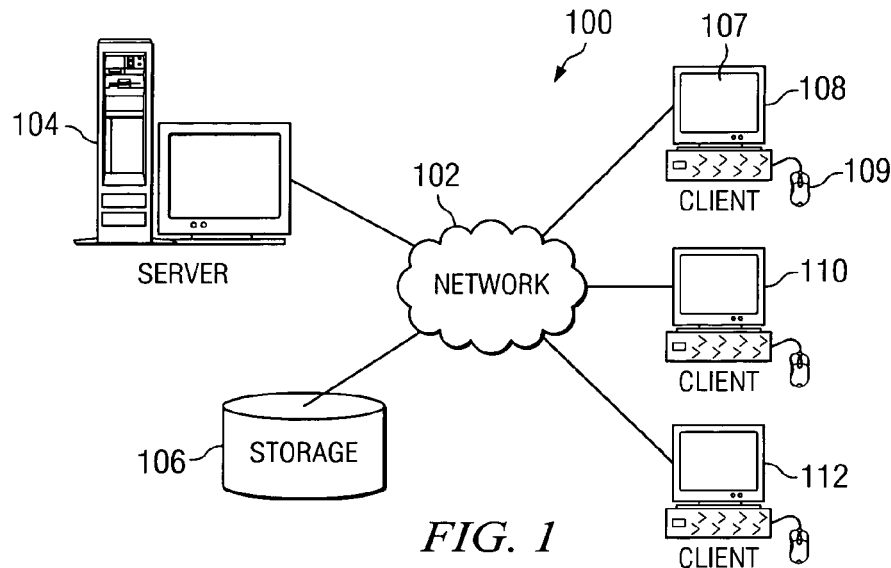
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, a personal computer or network computer. In the depicted example, server 104 provides data, such as HTML documents and attached scripts, applets, or other applications to clients 108, 110, and 112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention. Server 104 as illustrated is a web server, also referred to as a HTTP server, and includes server software that uses HTTP to serve up HTML documents and any associated files and scripts when requested by a client, such as a web browser. The connection between client and server is usually broken after the requested document or file has been served. HTTP servers are used on Web and Intranet sites.

Figure 2:
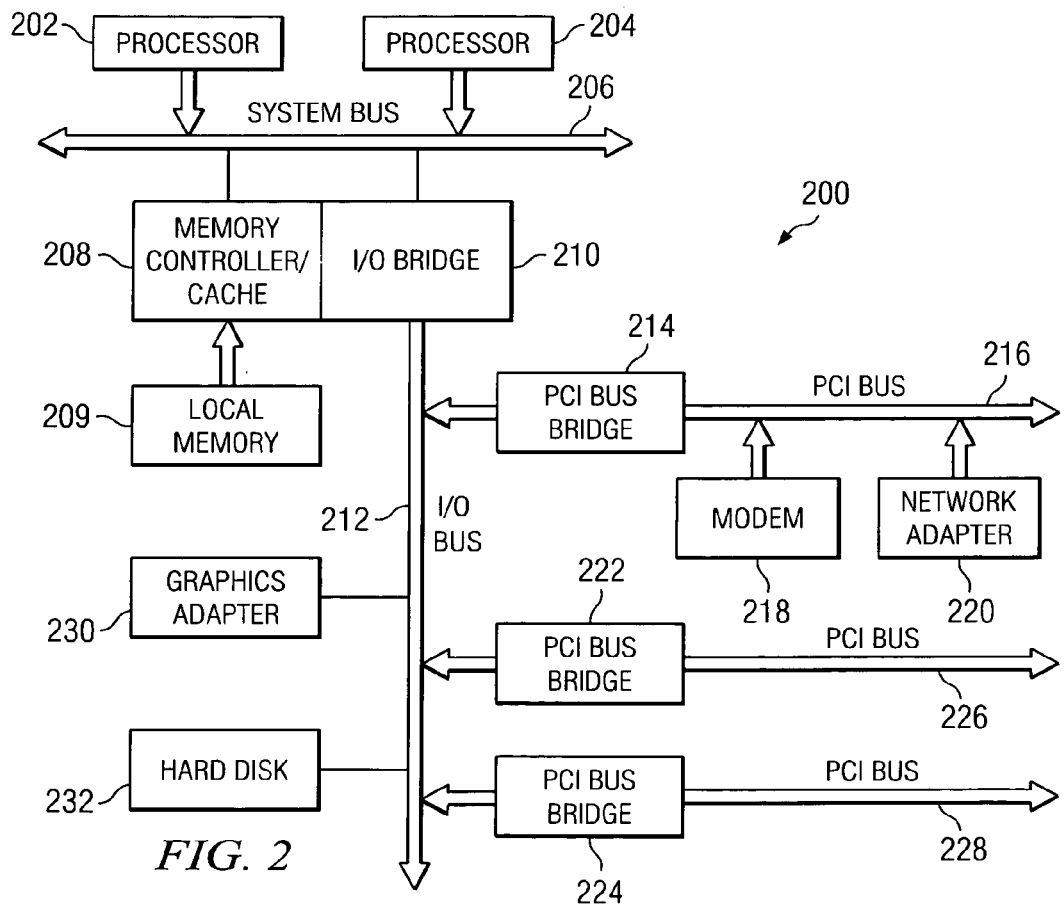
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 is an example of a computer that may be used to analyze parameters calculated from handwritten character strokes obtained from one or more of clients 108, 110, and 112. More specifically, data processing system 200 supplies data that is processed by a client for providing a computer interface on a display device by which a user of the client provides handwritten character input through the use of a pointing device. In the illustrative examples, an application provided to the client by data processing system 200 derives parameters from character strokes input by the user. A stroke parameter is scaled by calculating an input area and scaling the stroke parameter in relation to the calculated input area and a reference area. The input area is a measure of an area in which the user supplies one or more character strokes. The reference area is a measure of the size of reference characters of the reference character dictionary. A scaling factor is derived from the calculated input area and the reference area. For example, the scaling factor may be calculated as a ratio of the reference area to the calculated input area. The stroke parameter is adjusted up or down based on the scaling factor. The client application then communicates the stroke parameters including the scaled stroke parameter to data processing system 200. As an additional stroke is input, the input area and scaling factor may be adjusted. Responsive to receipt of the parameters, data processing system 200 identifies one or more candidate characters and communicates the candidate characters to the client.

A stroke parameter defines an attribute of the stroke input by the user and is compared with a corresponding attribute of a stroke of a reference character in a reference character dictionary by the server. For example, a stroke length parameter may be determined by the client that provides a numerical measure of the length of a handwritten character stroke input by the user. The stroke length parameter is communicated to the server and compared with a reference length parameter of a reference character stroke and a numerical measure is obtained indicating an amount of correspondence between the length of the handwritten character stroke and the length of the reference character stroke. A stroke angle parameter may be determined by the client that provides a numerical measure of the trajectory at which the handwritten character stroke was input. The stroke angle parameter is communicated to the server and compared with a reference angle parameter of a reference character stroke and a numerical measure is obtained indicating an amount of correspondence between the angle of the handwritten character stroke and the angle of the reference character stroke. A center parameter may be determined by the client that identifies a position or coordinate of a center point of the handwritten character stroke. The center parameter is communicated to the server and may be compared with other center parameters of handwritten character strokes to determine a positional relation among the strokes. The positional measure of the handwritten character strokes based on comparison of stroke center parameter may be compared with center parameter relations among reference character strokes to determine a numerical correspondence between the relative position of handwritten character strokes and the relative position of reference character strokes. An angle parameter, length parameter, and center parameter are collectively referred to herein as a stroke parameter set.

Results of the length, angle and center parameter comparisons are then evaluated to determine a correspondence between the handwritten character stroke and the reference stroke. The process is repeated by the server for the remaining reference characters of the reference character dictionary. One or more of the reference characters are identified as potential matches with the character being input and are communicated to the client.

Data processing system 200 may be a symmetric multi-processor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. System 200 runs a handwriting recognition algorithm in accordance with an embodiment of the invention as described more fully below.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
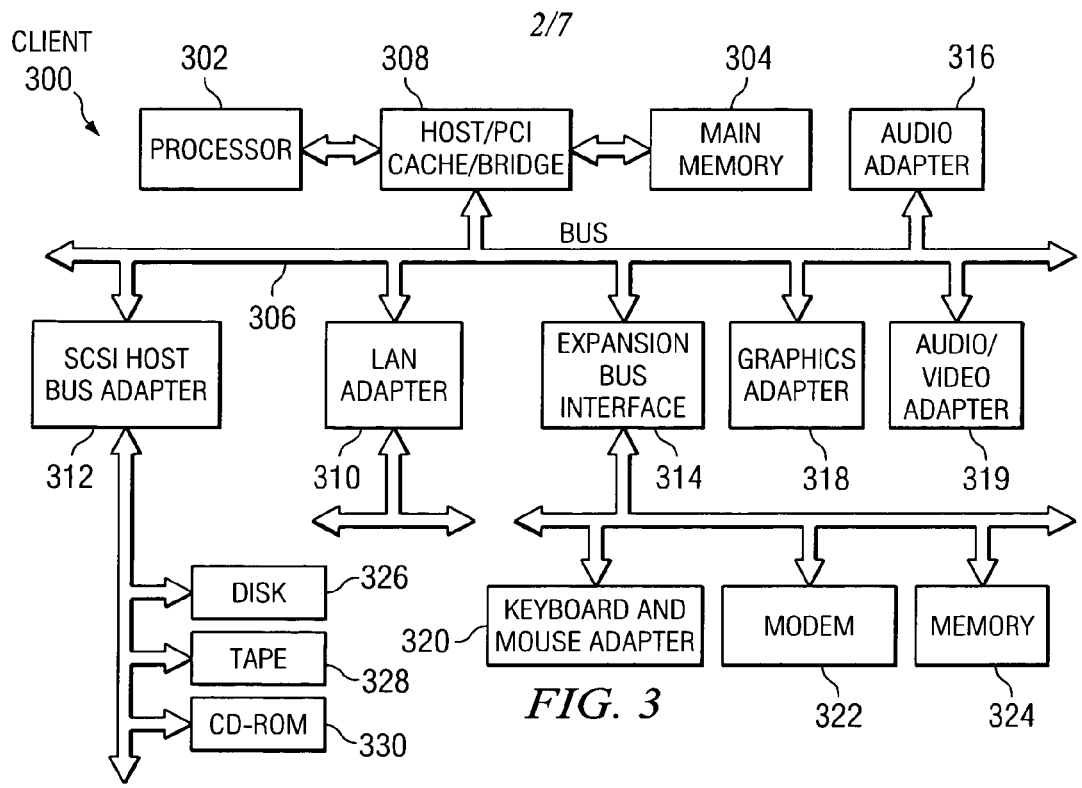
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer, such as client 108 in FIG. 1, which may be used for receiving a handwritten character from a user and for calculating stroke parameters of the handwritten character. More particularly, data processing system 300 receives a web page download from system 200 and, responsive to processing of the web page download, displays a computer interface for input of handwritten characters. Each character stroke of a handwritten character is evaluated for stroke start and end events. Data processing system 300 calculates an input area and one or more stroke parameters upon determination of the stroke start and end events.

Responsive to calculation of the input area and stroke parameters, data processing system 300 scales one or more of the calculated stroke parameters and communicates the stroke parameters to data processing system 200 for submission to the handwriting recognition algorithm executed by data processing system 200. A candidate character identified by data processing system 200 is communicated to data processing system 300 and the user is able to confirm a match between the character being supplied to the client computer interface and the candidate character identified by data processing system 200. Additional stroke parameters are calculated as the user continues supplying character strokes to the client computer interface. The input area is adjusted as additional strokes are input and one or more of the stroke parameters are scaled in response to the adjusted input area. The stroke parameters are communicated to system 200 for further handwriting analysis until a candidate character is confirmed as a match by the user of data processing system 300.

Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Graphics adapter 318 drives a display device 107 that provides the computer interface, or GUI, for displaying handwritten characters as supplied by the user. Expansion bus interface 314 provides a connection for a keyboard and mouse adapter 320, modem 322, and additional memory 324. A pointing device such as mouse 109 is connected with adapter 320 and enables supply of pointer input to system 300 by a user. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

The term "mouse", when utilized in this document, refers to any type of operating system supported graphical pointing device including, but not limited to, a mouse, track ball, light pen, stylus and touch screen or touch pad, and the like. A pointing device is typically employed by a user of a data processing system to interact with the data processing system's GUI. A "pointer" is an iconic image controlled by a mouse or other such devices, and is displayed on the video display device of a data processing system to visually indicate to the user icons, menus, or the like that may be selected or manipulated.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Data processing system 300 runs a web browser adapted to execute a character stroke collection algorithm in accordance with an embodiment of the invention. Preferably, the stroke collection algorithm is distributed to system 300 as a Java applet when the browser downloads a document, e.g., an HTML-encoded web page, from system 200. Accordingly, the browser executed by data processing system 300 may be implemented as any one of various well known Java enabled web browsers such as Microsoft Explorer, Netscape Navigator, or the like.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
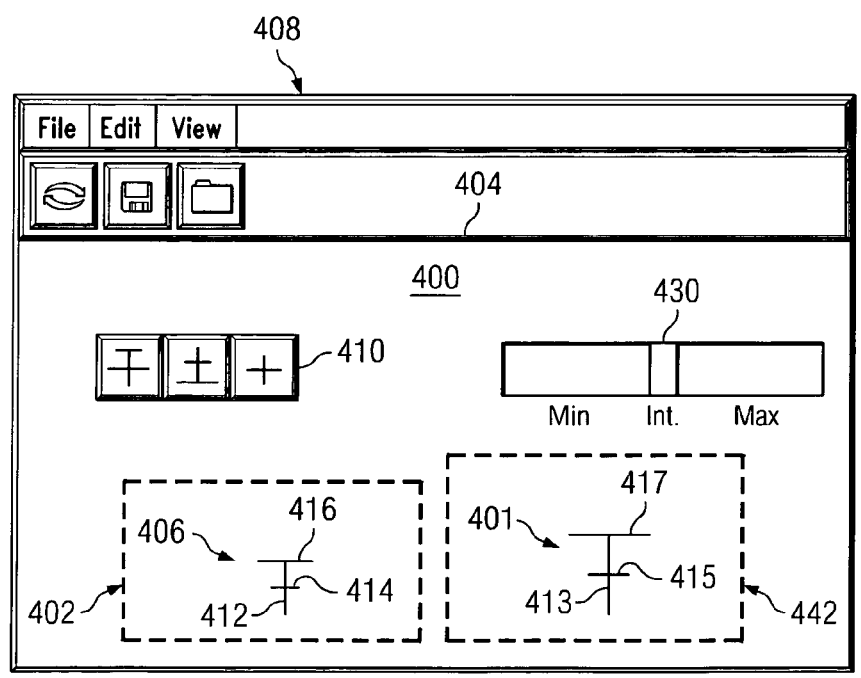
FIG. 4 is a diagram of a computer interface for accepting handwritten character input and displaying candidate characters in accordance with a preferred embodiment of the present invention.

FIG. 4 is a depiction of a GUI 400 output on display device 107 when a client connects with server 104 in accordance with a preferred embodiment of the present invention. GUI 400 is displayed responsive to the client processing a web page communicated from server 104. GUI 400 is preferably displayed in window 404 of a web browser interface 408. As illustrated in FIG. 4, GUI 400 includes capture area 402 for display of handwritten characters supplied to the client and candidate characters identified and communicated to data processing system 300 by data processing system 200 according to embodiments of the invention. The user supplies handwritten characters to capture area 402 via a pointing device such as mouse 109. Additionally, GUI 400 includes candidate character display 410 for display of the most recently determined candidate characters and for receiving confirmation of a candidate character match by the user.

GUI 400 may also include scaling window 442 that outputs a scaled version of the handwritten character or handwritten character strokes supplied to capture area 402. The graphic output of scaling window 442 may include scaled-up or scaled-down character strokes that correspond to a handwritten character stroke input by the user into capture area 402. In the illustrative example, scaling window 442 outputs a scaled character 401 that is derived from character 406 by scaling character 406 by a predefined amount. Particularly, scaled character 401 consists of scaled character strokes 413, 415, and 417 that respectively correspond to strokes 412, 414, and 416 input by the user into capture area 402. Scaling window 442 provides a visual output with a consistent size and provides a mechanism for providing the user with a uniform visual feedback of the handwritten character data being entered.

Scaling window 442 may be statically dimensioned, that is set to a predefined area of GUI 400. Moreover, a scaled stroke displayed in scaling window 442 may be rescaled after input of a subsequent handwritten stroke by the user. For example, assume stroke 412 is the first stroke of character 406 input by the user. Scaled stroke 413 is derived by scaling handwritten character stroke 413 to fit within scaling window 442. Further assume stroke 414 is the second stroke of character 406 input by the user. Scaled stroke 415 is derived by scaling stroke 414. It is preferable that scaled stroke 413 is rescaled in proportion to scaled stroke 415 such that both scaled strokes 413 and 415 fit within scaling window 442. As additional handwritten character strokes are input into capture area 402, corresponding scaled strokes are derived from the handwritten input and previously scaled strokes may be rescaled in proportion to one another for display in scaling window 442. In accordance with a preferred embodiment of the present invention, scaled strokes displayed in scaling window 442 are scaled according to an input area that is a portion of the capture area. The input area is calculated from handwritten stroke extrema and a reference area. Calculation of the input area is described more fully below.

In the illustrative example, a complete Chinese character 406 is shown entered into capture area 402. Input of character 406 requires a number of hand strokes. The particular character shown requires input of three strokes 412, 414, and 416. The stroke collection algorithm executed by the client detects the beginning and end of each character stroke supplied to capture area 402. Upon detection of a completed stroke, an input area and a stroke parameter set are calculated from the detected stroke. One or more of the stroke parameters are scaled according to the input area as described more fully below. The stroke parameters are then communicated to data processing system 200 for identification of one or more candidate characters that may match the user input.

Figure 5:
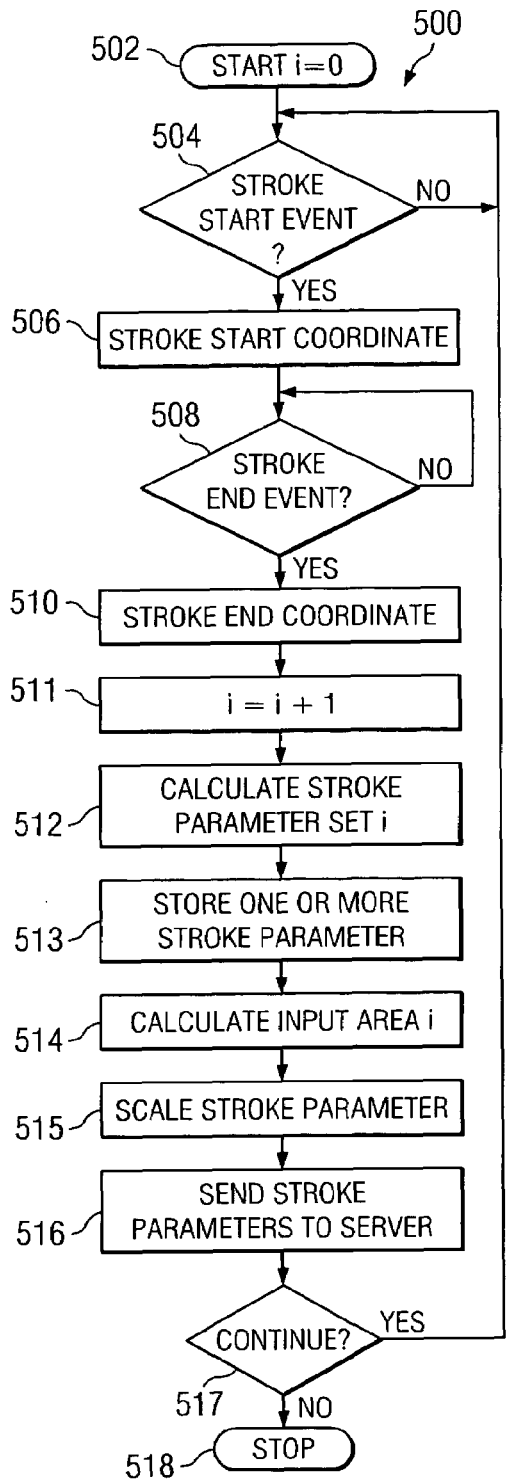
FIG. 5 is a flowchart of the processing performed by a client for collecting handwritten character strokes according to a preferred embodiment of the present invention.

FIG. 5 is a flowchart of the processing performed by the stroke collection algorithm executed by the client according to a preferred embodiment of the invention. The stroke collection algorithm is initiated and a stroke counter i is initialized to zero (step 502). The stroke collection algorithm proceeds to poll for a stroke start event (step 504). In the depicted example, a stroke start event is a pointing device "down" event, such as depression of a mouse button. Upon detection of a stroke start event, the stroke collection algorithm temporarily records a coordinate of the stroke start event (step 506) and proceeds to poll for a stroke end event (step 508). In the illustrative examples, a stroke end event is a pointing device "up" event such as release of a mouse button.

Upon detection of the stroke end event, a coordinate of the stroke end event is read (step 510) and the stroke counter i incremented (step 511). A stroke parameter set i is calculated from the stroke start and end coordinates (step 512), and one or more of the calculated stroke parameters may be stored by the client (step 513). Additionally, an input area i is calculated from the stroke start and end coordinates or from one or more of the calculated stroke parameters (step 514). A scaling factor is then derived from the input area and the reference area, and one or more of the stroke parameters are adjusted according to the scaling factor (step 515). The stroke parameter set i including the scaled stroke parameter is then communicated to data processing system 200 for analysis by the handwriting recognition algorithm (step 516). An evaluation of whether to continue is made (step 517), and the routine returns back to step 504 to poll for another stroke start event. Otherwise, the routine exits (step 518).

Other stroke parameters may be derived from a handwritten character stroke and may be communicated to data processing system 200 with, or in substitution of, the described stroke parameters. For example, the client may measure stroke speed by, for example, calculating a distance between stroke pixels supplied at a predefined time interval. Additionally, stroke ratio measurements may be made by the client. Various other stroke parameters may be derived from the user input. Moreover, the client may calculate additional stroke parameters and temporarily store the additional stroke parameters. Some stroke parameters may be stored by data processing system 300 and communicated to the data processing system 200 on an as-needed basis. That is, the handwriting recognition algorithm may be configured to attempt a candidate character identification based on stroke parameters sent to the server upon calculation by the client. The server may request additional stroke parameters from the client if needed, for example to refine stroke parameter and reference parameter comparison results.

Figure 6:
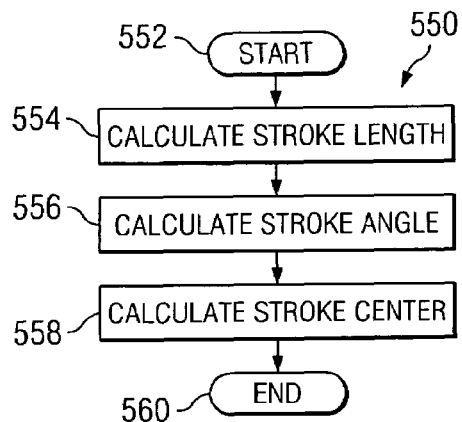
FIG. 6 is a flowchart of stroke parameter calculations performed by the client in accordance with a preferred embodiment of the present invention.

FIG. 6 is a flowchart 550 of processing performed by a stroke parameter calculation subroutine of the stroke collection algorithm in accordance with a preferred embodiment of the present invention. The processing steps shown and described in FIG. 6 correspond to step 512 of FIG. 5. Calculation of the stroke parameter set i is initiated upon detection of a stroke start event and subsequent stroke end event (step 552). A stroke length parameter is calculated from stroke start and end point coordinates (step 554). For example, pointer icon coordinates corresponding to the stroke start and end events may be algebraically processed to determine a linear "length" measure between the stroke start and end points. Additionally, a stroke angle parameter is calculated through, for example, trigonometric relations of the stroke start and end coordinates and provides a directional measure of the stroke (step 556). A stroke center parameter is preferably calculated (step 558) and may be derived from the stroke length and angle parameters and one of the stroke start and end event coordinates. Upon calculation of the stroke parameters, the stroke parameter calculation subroutine exits (step 560).

Figure 7:
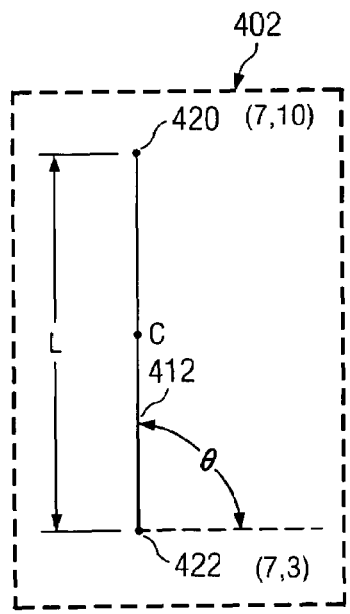
FIG. 7 is a diagram illustrating calculation of stroke parameters by the client according to a preferred embodiment of the present invention.

FIG. 7 is a diagram illustrating calculation of stroke parameters by the stroke collection algorithm according to a preferred embodiment of the invention. A stroke start event is detected in response to a suitable command provided to a pointing device such as mouse 109. For example, a stroke start event may be detected in response to a mouse "down" event, or initiation of a mouse drag operation by depression of a mouse 109 button, while the mouse pointer is located within collection area 402. Alternatively, a stroke start event may be determined in response to a stylus down event detected on a touch pad if handwritten characters are provided to a touch pad. A start point 420 of stroke 412 is identified and corresponds to the mouse position when the stroke start event is detected. Alternatively, start point 420 corresponds to a stylus position on a touch pad when the stroke start event is detected. As mouse 109 is moved, stroke 412 is displayed within capture area 402 according to the movement of the mouse supplied by the user. A stroke end event is detected in response to a suitable command provided to mouse 109 such as a mouse "up" or button release event. Alternatively, the stroke end event may be detected in response to a stylus up event detected on a touch pad if handwritten characters are provided to a touch pad. An end point 422 of stroke 412 is identified and corresponds to the mouse or stylus position when the stroke end event is detected.

A coordinate system, e.g., a Cartesian coordinate system, is used for tracking the position of the mouse and associating respective coordinates with start and end points 420 and 422. In the present example, stroke 412 has start point 420 with an x-coordinate of 7 and a y-coordinate of 10. Stroke 412 has end point 422 with an x-coordinate of 7 and a y-coordinate of 3. After the start and end point pair of stroke 412 are detected, one or more stroke parameters are derived from the start and end point coordinates for submission to the handwriting recognition algorithm running on data processing system 200. In accordance with a preferred embodiment of the invention, a stroke length parameter (L), a stroke angle parameter ($\theta$), and a stroke center parameter (C) are calculated from the start and end point coordinates. For example, the stroke length may be calculated by algebraic manipulation of the start and end point coordinates. The stroke angle parameter is derived from the start and end point coordinates, for example by a computer-implemented trigonometric relation between the coordinates of stroke start and end points 420 and 422.

Additionally, the stroke center parameter is calculated by a computer-implemented trigonometric computation using one of the start and end point coordinates, the stroke length parameter and the stroke angle parameter as operands. The stroke center parameter is a coordinate of a calculated center point of stroke 412. In the preferred embodiment, the stroke parameters are calculated by approximating the stroke as a linear motion. Accordingly, all stroke parameters may be derived using only the stroke start and end point coordinates. One or more of the stroke parameters are scaled and are transmitted to data processing system 200 by way of network 102.

Notably, the stroke collection algorithm running on client system 300 does not wait until character completion by the user before attempting to identify the character being input by the user. Accordingly, communication of a stroke parameter set derived from one stroke input may be made to data processing system 200 concurrently with supply of a subsequent stroke by the user. Preferably the stroke collection algorithm described with reference to FIGS. 5-7 is implemented as a Java applet that is downloaded as a Web page attachment when data processing system 200 connects with data processing system 300.

Figure 8:
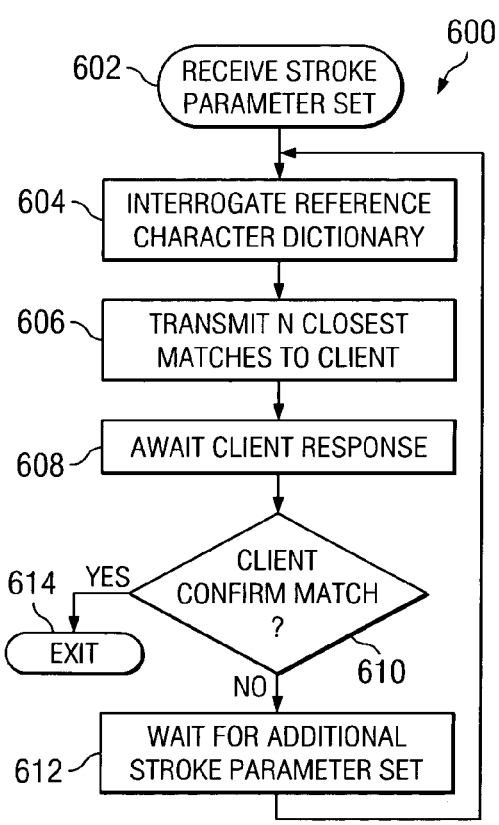
FIG. 8 is a flowchart of processing performed by a handwriting recognition algorithm executed by a server according to a preferred embodiment of the present invention.

FIG. 8 is a flowchart 600 of processing performed by the handwriting recognition algorithm executed by data processing system 200 according to a preferred embodiment of the invention. The handwriting recognition algorithm is initiated upon receipt of a stroke parameter set from the client system (step 602). A reference character dictionary look-up is performed responsive to receipt of the stroke parameter set (step 604). The reference character dictionary may be, for example, implemented as a table, file system, or another suitable data structure. In general, the reference character dictionary comprises attributes of each character of the dictionary that are able to be matched with stroke parameters calculated from the user supplied handwritten character strokes.

More particularly, the reference character dictionary includes attributes of each stroke, such as stroke length, angle, and center parameters. Stroke length, angle, and center parameters of a reference character stroke are collectively referred to herein as a reference parameter set. The reference parameters maintained in the reference character dictionary for a particular reference character entry are compared with a corresponding stroke parameter of the stroke parameter set communicated to the server by the client. A numerical measure, or match probability, of a correspondence between the stroke parameter set and reference parameter sets is generated for one or more of the reference characters defined in the reference character dictionary.

A number N of possible character matches, or candidate characters, are retrieved from the reference character dictionary and are communicated to system 300 (step 606). The number of candidate characters retrieved from the reference character dictionary may be coded into the handwriting recognition algorithm or may be provided by the client.

Alternatively, character entries of the reference character dictionary having respective reference parameters that result in match probabilities in excess of a predefined threshold may be selected as candidate characters for communication to the client. Data processing system 200 awaits a response from the client (step 608). An evaluation of whether the client confirms any of the candidate characters as a match with the character being input is made (step 610).

If the client provides a response that none of the N candidate characters correspond to the handwritten character being input or fails to confirm a candidate character match, handwriting recognition processing proceeds to await for receipt of an additional stroke parameter set (step 612). Another interrogation of the reference character dictionary is performed upon receipt of an additional stroke parameter set.

If the client response confirms one of the N candidate characters as a character match corresponding to the handwritten character, the handwriting recognition processing terminates (step 614). Thus, the reference character dictionary interrogation continues for each stroke of the character supplied by the user until a candidate character obtained by the handwriting recognition algorithm is confirmed as a match by the user. Preferably, the handwriting recognition algorithm illustrated and described with reference to FIG. 8 is implemented as a Java servlet. A more detailed processing description of the handwriting recognition algorithm is described below with reference to FIG. 14.

Figures 9, 12A, 12B:
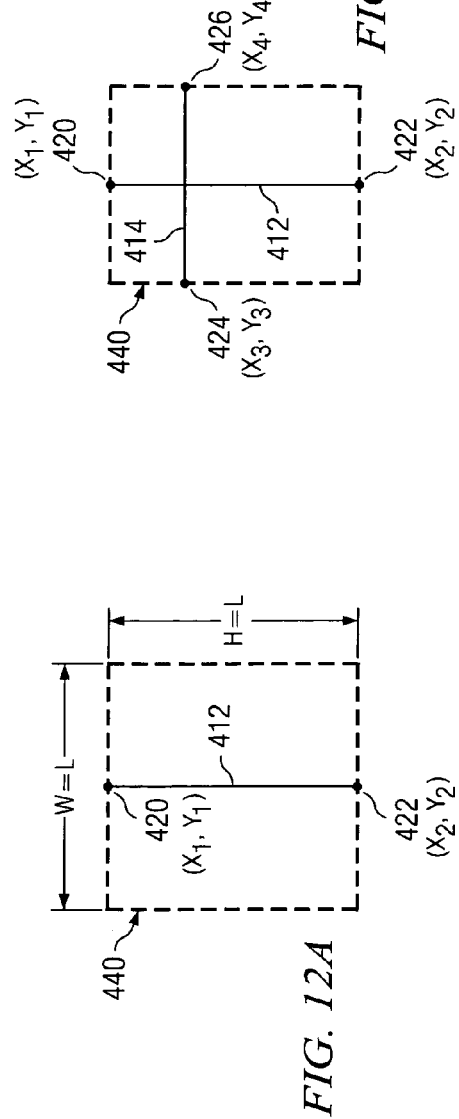
FIG. 9 is a diagrammatic illustration of reference character dictionary records used for identifying candidate characters in accordance with a preferred embodiment of the present invention.
FIG. 12A is a diagrammatic illustration of a calculation of an input area after input of a first stroke of a character in accordance with a preferred embodiment of the present invention.
FIG. 12B is a diagrammatic illustration of an input area calculation after input of a second stroke of a character in accordance with a preferred embodiment of the present invention.

FIG. 9 is a diagrammatic illustration of records 720-725 of reference character dictionary 700. Typically, a reference character dictionary of Chinese characters will have thousands of records. The records shown and described are chosen only to facilitate an understanding of the invention. Reference character dictionary 700 is implemented as a table having records 720-725 that respectively include data elements in respective fields 710-718, but other data structures may be suitably substituted. Fields 710-718 typically have a name, or identifier, that facilitates insertion, deletion, querying, and processing of other data operations or manipulations of dictionary 700. In the illustrative example, fields 710, 711, and 712 have respective labels of character number, character, and strokes. Fields 713-717 are labeled reference parameter set1-reference parameter set5, respectively. Field 718 has a label of audio in this example. Reference parameter set fields 714-717 contain reference parameter sets for respective records 720-725.

Each record 720-725 contains a unique index number in key field 710 for distinguishing a particular record from other dictionary 700 entries. Addressing a particular record via an associated key field 710 value is referred to herein as indexing of the record. The character field 711 includes image data of the reference character defined by respective records 720-725. For example, record 723 has an image file, or a reference to an image file such as an address of the image file, in character field 711 that corresponds to the handwritten character supplied to the computer interface described with reference to FIG. 4.

Strokes field 712 contains a data element having a value that specifies the number of constituent character strokes of the reference character defined by respective records 720-725. For example, the character having attributes defined by record 723 consists of a vertical stroke and two horizontal strokes, and strokes field 712 accordingly contains the value of three in record 723. Reference parameter set fields 713-717 include a reference parameter set for each stroke of the character described by respective records 720-725. Reference parameter set fields 713-715 of record 723, for instance, respectively include a reference parameter set of a stroke of the character defined by record 723, and reference parameter set fields 716 and 717 are nulled. Reference parameters stored in reference parameter set fields 713-717 are preferably derived according to a fixed reference character size, or reference area. For example, a size of the reference characters from which the reference parameters are derived may be a fixed pixel volume or area. Additionally, an audio field 718 may be included in dictionary 700 that contains, or references, an audio file that is an audio recording of a correct pronunciation of the character defined in respective records 720-725.

Upon receipt of a stroke parameter set, system 200 interrogates the reference dictionary. In general, the handwriting recognition algorithm cycles through the entries of dictionary 700 and compares the stroke parameters of the stroke parameter set with corresponding parameters of the reference parameter set. For example, the length parameter of the stroke parameter set is compared with the length parameter of reference parameter sets of the reference character dictionary. Likewise, the angle and center parameters of the stroke parameter set are compared with respective angle and center parameters of reference parameter sets. Match probabilities are generated in response to the comparison of the stroke parameter set with the reference parameter sets. In response to an evaluation of the match probabilities, one or more candidate characters are selected by the server and returned to data processing system 300 for display in candidate character display 410. For example, data processing system 200 may communicate to the client images as identified in character field 711 of the three reference character dictionary entries having the highest match probabilities obtained from the dictionary interrogation. Additionally, audio files of the candidate characters may be communicated to the client with the candidate character images.

Figure 10A:
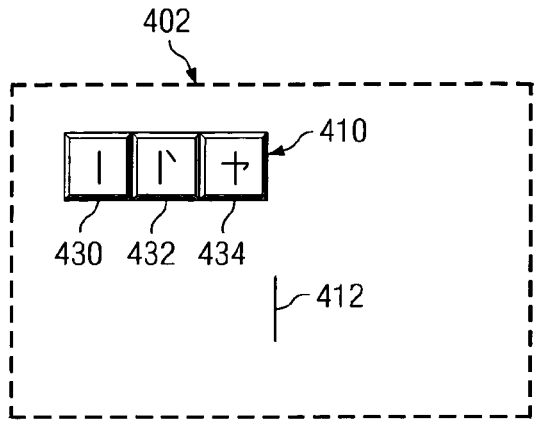
FIG. 10A is a diagram illustrating a capture area and candidate display in a computer interface after user input of a first character stroke in accordance with a preferred embodiment of the present invention.

With reference now to FIG. 10A, a diagrammatic illustration of capture area 402 and candidate display 410 is shown after user input of a first stroke 412 of character 406. A stroke parameter set for stroke 412 is calculated by the client. An input area is then calculated as described more fully below and at least one of the calculated stroke parameters are scaled in relation to the input area and the reference area. The stroke parameter set including a scaled stroke parameter is then communicated to data processing system 200 for identification of candidate characters. Data processing system 200 interrogates the reference character dictionary with the stroke parameter set and identifies one or more candidate characters based on a comparison of the stroke parameter set and reference parameter sets of records 720-725. The candidate characters identified by data processing system 200 are communicated to the client for output in candidate display 410. In the illustrative example, three candidate characters 430, 432, and 434 have been identified and are displayed in candidate display 410. If a candidate character identified by system 200 matches the character being input to the client, the user is able to select the correct candidate character in candidate display 410. In the present example, none of the candidate characters identified after input of first stroke 412 match character 406 being written by the user.

Figure 10B:
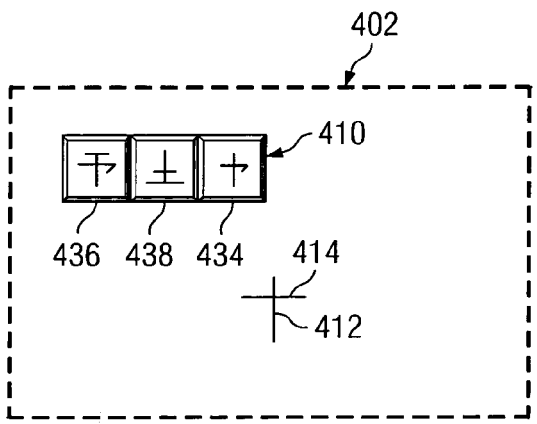
FIG. 10B is a diagram illustrating the capture area and candidate display described in FIG. 10A after user input of a second character stroke in accordance with a preferred embodiment of the present invention.

With reference now to FIG. 10B, a diagrammatic illustration of capture area 402 and candidate display 410 after user input of first and second strokes 412 and 414 of character 406 is shown. A stroke parameter set for stroke 414 is calculated and the input area may be adjusted, or recalculated, in accordance with first and second strokes 412 and 414. At least one of the stroke parameters calculated for second stroke 414 may be scaled according to the adjusted input area. The stroke parameter set of second stroke 414 is then communicated to system 200 for an additional interrogation of reference character dictionary 700. Additionally, the stroke parameter set of first stroke 412 stored by the client may be retrieved and rescaled according to the input area calculated after input of second stroke 414. The rescaled stroke parameter set of first stroke 412 is communicated to data processing system with the scaled stroke parameter set of second stroke 414. Data processing system 200 interrogates reference character dictionary 700 with the stroke parameter set calculated by the client from stroke 414 and identifies one or more candidate characters. The candidate characters identified by data processing system 200 are communicated to the client for output in candidate display 410. In the illustrative example, candidate characters 430 and 432 have been eliminated as candidates after the second interrogation of the reference character dictionary and new candidate characters 436 and 438 have been identified and communicated to the client for output in candidate display 410. Candidate character 436 matches the character being supplied to capture area 402. The user confirms that candidate character 436 matches the character being entered by, for example, positioning the pointer within the display area of candidate character 436 and providing an input to the mouse. The client provides a confirmation message to system 200 upon supply of the confirmation input by the user. Preferably, the candidate character selected by the user from candidate display 410 is then displayed in collection area 402 and an audio playback of the selected character may be output by data processing system 200. The user may then begin input of an additional character within capture area 402.

In accordance with a preferred embodiment of the present invention, at least one of the stroke parameters of a stroke parameter set are scaled according to a calculated input area in which the user supplies a handwritten character stroke. Preferably, the length parameter derived from stroke start and end points is scaled according to the input area in which the user supplies the handwritten character strokes. A input area, as referred to herein, is an area that bounds a character stroke, or strokes, at stroke coordinate extrema. The input area is calculated after determination of a stroke start and end point. The scaling of a stroke parameter is performed by determining a scaling factor derived from the calculated input area and a reference area.

Figure 11A:
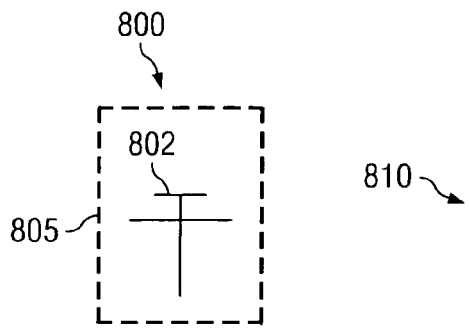
FIG. 11A is a diagrammatic illustration of a reference character defined by a record of a reference character dictionary in accordance with a preferred embodiment of the present invention.

In an exemplary embodiment, the scaling factor is a ratio of the reference area to the most recently calculated input area. Consider, for example, FIG. 11A that shows a diagrammatic illustration of reference character 800 defined by record 723 of reference character dictionary 700 of FIG. 9. Attributes, particularly reference parameters of length, angle, and center, of reference character 800 are specified by reference parameter fields 713-715. For illustrative purposes, assume attributes of reference character stroke 802 are defined by the reference parameter set stored in field 713 of record 723. Thus, the reference length parameter L6 is representative of a length of the topmost horizontal stroke of reference character 800 and provides a basis for identifying a correspondence, or lack thereof, between a length of a stroke input by the user and the topmost horizontal stroke of reference character 800.

Figure 11B:
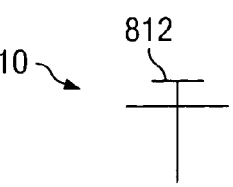
FIGS. 11B and 11C are diagrammatic illustrations of two correctly written handwritten characters that correspond to the reference character described in FIG. 11A.
Figure 11C:
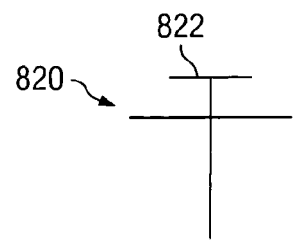

A potential character match between a handwritten character being input and a reference character is made by determining the correspondence between parameters derived from handwritten character strokes being input by the user and the reference parameters of records 720-725. Thus, variations in handwritten character identification may result from the size at which a user inputs a character. For example, FIGS. 11B and 11C are diagrammatic illustrations of two correctly written handwritten characters 810 and 820 that correspond to reference character 800. That is, stroke length ratios, directions, and relative positions among the strokes of characters 810 and 820 generally conform to reference character 800. However, handwritten character 810 is written at a much smaller font size than is handwritten character 820. Thus, when comparing a length parameter of a reference character stroke with a length parameter of a handwritten stroke such as handwritten stroke 812 or 822 of handwritten characters 810 and 820, a match may not be properly identified due to the user supplying the stroke at a different size than that at which the reference character parameters were derived. Accordingly, the present invention provides a technique for scaling input strokes according to a calculated input area in which the character is being input.

The present invention utilizes reference area 805 associated with reference characters defined by reference character dictionary 700 that provides a mechanism for providing a relational measure between the reference character size and the size of a character being input by the user. As referred to herein, a reference area is a predefined area in which each of the reference characters of the reference character dictionary may be contained.

With reference now to FIG. 12A, a diagrammatic illustration is shown of a calculation of input area 440 after input of first stroke 412 of a handwritten character stroke in accordance with a preferred embodiment of the present invention. Input area 440 is illustratively denoted with dashed lines and may or may not be displayed in the capture area of the computer interface. Preferably, input area 440 is calculated to bound the x-coordinate and y-coordinate extrema of any strokes input by the user. First stroke 412 has start point 420 and end point 422 having coordinates $(x_1, y_1)$ and $(x_2, y_2)$, respectively. The length parameter $L_1$ of stroke 412 is calculated by, for example, a computer-implemented Pythagorean theorem calculation performed by the stroke collection algorithm according to equation 1:

$$L_1 = \sqrt{(x_2-x_1)^2 + (y_2-y_1)^2} \qquad \text{equation 1}$$

After input of a single stroke, input area 440 having an area $A_{c1}$ may be calculated from the length parameter $L_1$. In the illustrative example, input area 440 bounds stroke 412 at coordinate extrema of stroke 412 and is a square having side lengths H and W equal to the length parameter $L_1$ of first stroke 412, that is:

$$A_{c1} = (x_2-x_1)^2 + (y_2-y_1)^2. \qquad \text{equation 2}$$

The length parameter $L_1$ is then scaled according to a scaling factor derived from the input area and the reference area. The reference area is preferably communicated to data processing system 300 on connection with data processing system 200. That is, the reference area is coded into the stroke collection algorithm conveyed to the client. An exemplary scaling calculation of the length parameter is calculated according to the following:

$$L_{S1}=(A_r/A_{C1})L_1, \qquad \text{equation 3}$$

where $L_{S1}$ is the scaled length parameter of first stroke 412, $A_r$ is the predefined reference area, $L_1$ is the length parameter of first stroke 412, and $A_{C1}$ is the input area calculated after input of first stroke 412. The ratio of reference area to input area $A_r/A_c$ is the scaling factor.

Thus, a length parameter calculated from an oversized input stroke is adjusted down in proportion to the scaling factor. A length parameter calculated from an undersized input stroke is adjusted up by the scaling factor.

The stroke parameter set for stroke 412 including the scaled length parameter is communicated to data processing system 200 for identification of candidate characters as described above.

For illustrative purposes, assume that none of the candidate characters identified by data processing system 200 match the character being input by the user. With reference now to FIG. 12B, a diagrammatic illustration of an input area calculation after user input of second stroke 414 of a handwritten character in accordance with a preferred embodiment of the present invention is shown. Preferably, the input area is calculated based on x- and y-coordinate stroke extrema when two or more strokes have been input by the user. An exemplary calculation of the input area when two or more strokes have been entered by the user is provided by the following $$A_{ci}=(x_{max}-x_{min})\times(y_{max}-y_{min}), \qquad \text{equation 4}$$

where $A_{ci}$ is the input area calculated after input of the $i^{th}$ stroke with i begin at least two, $x_{max}$ is the rightmost x-coordinate of any start or end point of a user entered stroke, $x_{min}$ is the leftmost x-coordinate of any start or end point of a user entered stroke, $y_{min}$ is the lowermost y-coordinate of any start or end point of a user entered stroke, and $y_{max}$ is the uppermost y-coordinate of any start or end point of a user entered stroke.

In the illustrative example, second stroke 414 has a start point 424 and end point 426 with x- and y-coordinates of ($x_3$, $y_3$) and ($x_4$, $y_4$), respectively. The stroke collection algorithm evaluates start and end point coordinates of first and second strokes 412 and 414. In the illustrative example, the leftmost x-coordinate is identified as the x-coordinate of second stroke 414 start point 424, and the rightmost x-coordinate is identified as the x-coordinate of second stroke 414 end point 426. In a similar manner, the lowermost y-coordinate of input area 440 is identified as the y-coordinate of first stroke 412 end point 422, and the uppermost y-coordinate is identified as the y-coordinate of first stroke 412 start point 420. Thus, the input area of the illustrative example is calculated as:

$$A_{c2}=(x_4-x_3)\times(y_1-y_2)$$

The length parameter of stroke 414 is then scaled according to the ratio of the reference area to the newly calculated input area according to the following:

$$L_{S2}=(A_r/A_{C2})L_2,$$

where $L_{S2}$ is the scaled length parameter of second stroke 414, $A_{C2}$ is the input area calculated after input of second stroke 414, and $L_2$ is the length parameter of second stroke 414. The stroke parameter set including scaled length parameter $L_{S2}$ is communicated to data processing system 200 for interrogation of reference character dictionary 700.

Preferably, data processing system 300 temporarily stores each length parameter calculated from a character stroke until a match is identified by data processing system 200 and is confirmed at data processing system 300. It is additionally preferable that length parameters calculated from previous stroke inputs are scaled according to the most recently calculated input area and are communicated to data processing system 200 with the most recent stroke parameter set. For instance, the length parameter $L_1$ calculated from first stroke 412 may be rescaled according to the input area $A_{C2}$ calculated after input of second stroke 414. The rescaled length parameter for first stroke 412 is then communicated to data processing system 200 with the stroke parameter set of second stroke 414. Accordingly, the handwriting recognition algorithm may interrogate reference character dictionary with length parameters of multiple strokes that are scaled according to the most recently calculated input area.

Figure 13:
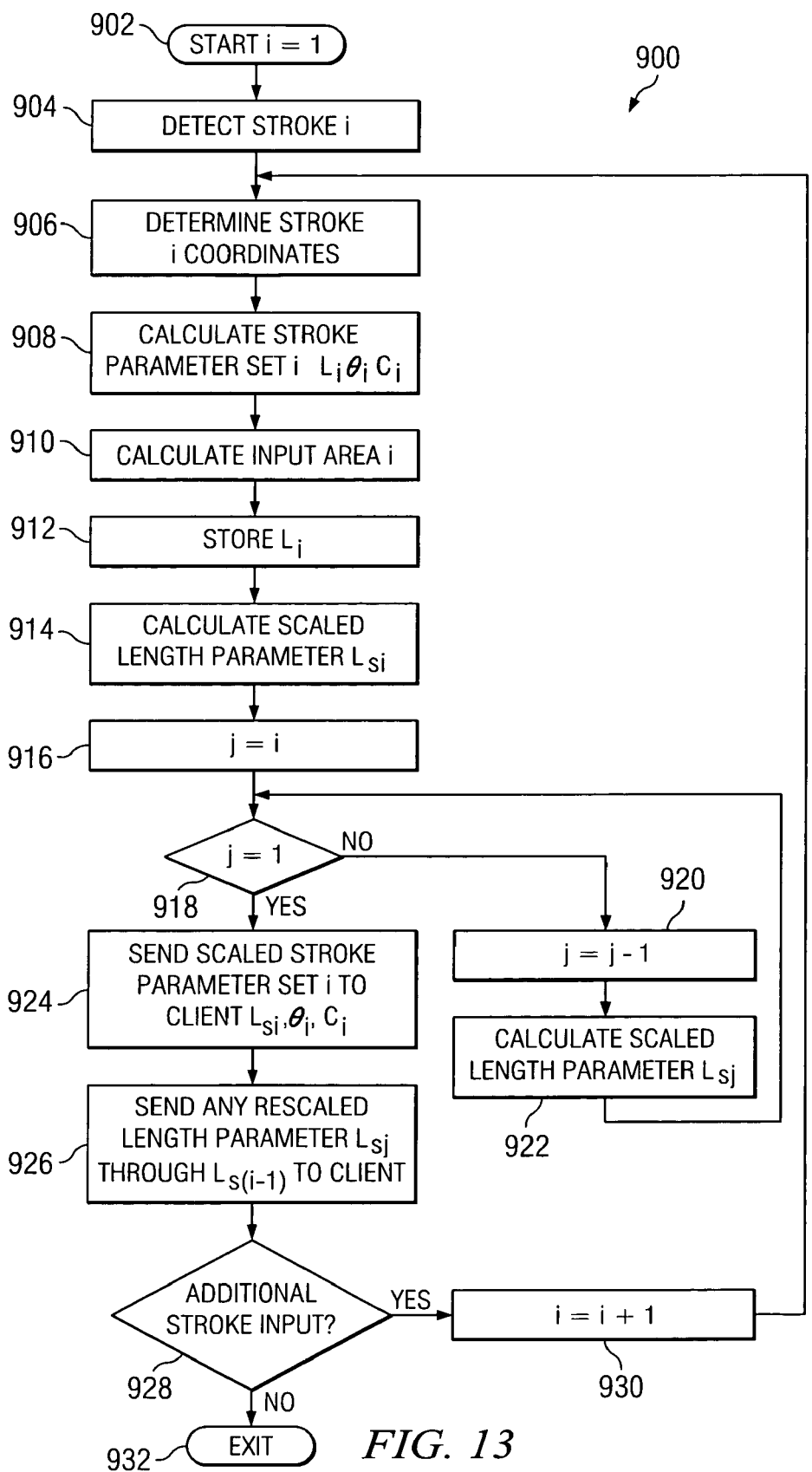
FIG. 13 is a flowchart that shows processing performed by a stroke collection algorithm in accordance with a preferred embodiment of the present invention.

With reference now to FIG. 13, flowchart 900 shows processing performed by the stroke collection algorithm executed by data processing system 300 in accordance with a preferred embodiment of the present invention. The stroke collection algorithm is invoked and a stroke counter index i is initialized to 1 (step 902). Input of stroke i is detected (step 904) and stroke coordinates are determine for stroke i (step 906). A stroke parameter set i is calculated including a length parameter $L_i$, an angle parameter $\Theta_i$, and a center parameter $C_i$. An input area i is calculated in accordance with the input stroke i (step 910) and the calculated stroke length parameter $L_i$ may be temporarily stored (step 912). A scaled length parameter $L_{si}$ is next calculated as described above (step 914).

An index j is set to the current stroke count (step 916) and an evaluation is made to determine if the current stroke parameter set is derived from a first stroke input (step 918). If the current stroke parameter set is not derived from the first stroke, that is if index j is greater than 1, the index j is decremented (step 920) and the previous length parameter $L_j$ is retrieved and scaled according to the most recent input area i calculation (step 922). Processing then returns back to step 918. The stroke collection algorithm continues resealing previously received stroke length parameters until the first stroke parameter $L_1$ has been rescaled according to the most recent input area i calculation.

The stroke collection algorithm then sends the scaled parameter set i calculated from the current stroke to the client (step 924). The scaled parameter set i includes the angle parameter $\Theta_i$ and center parameter $C_i$ calculated from start and end points of stroke i and the scaled length parameter $L_{si}$. Additionally, the stroke collection algorithm sends any rescaled length parameter to the client (step 926). The scaled length parameter set i and any rescaled length parameter $L_{sj}$ through $L_{s(i-1)}$ are preferably communicated to data processing system 200 as a single data package, e.g., in a single HTTP session between data processing system 300 and data processing 200.

The stroke collection algorithm then evaluates whether an additional stroke input is made (step 928). If an additional stroke is entered, the stroke index counter i is incremented (step 930) and the stroke collection algorithm returns back to step 906. Otherwise, the stroke collection algorithm exits (step 932).

Referring again to FIGS. 11A-11C, it was previously noted that comparison of a stroke length parameter with a reference length parameter without scaling of the stroke length parameter may produce undesirable comparison results due to differences in the input character size supplied by the user and the reference area from with reference stroke parameters are derived.

Notably, however, angle parameter calculations made from handwritten character strokes do not depend on the input size of the character. For instance, each of strokes 812 and 822 of handwritten characters 810 and 820 would result in equivalent angle parameters for the respective strokes although handwritten characters 810 and 820 are of two different sizes. It should also be noted that as additional strokes of a character being input are entered by the user, the recalculated input area becomes a more accurate indication of the area in which the user is supplying the character.

In accordance with another embodiment of the present invention, the server applies a greater weight to comparisons made between reference angle parameters and stroke angle parameters for the initial comparison, or an initial set of comparisons, due to the reliability of the angle parameter as a stroke attribute measurement that is not dependent on the input stroke size.

Figure 14:
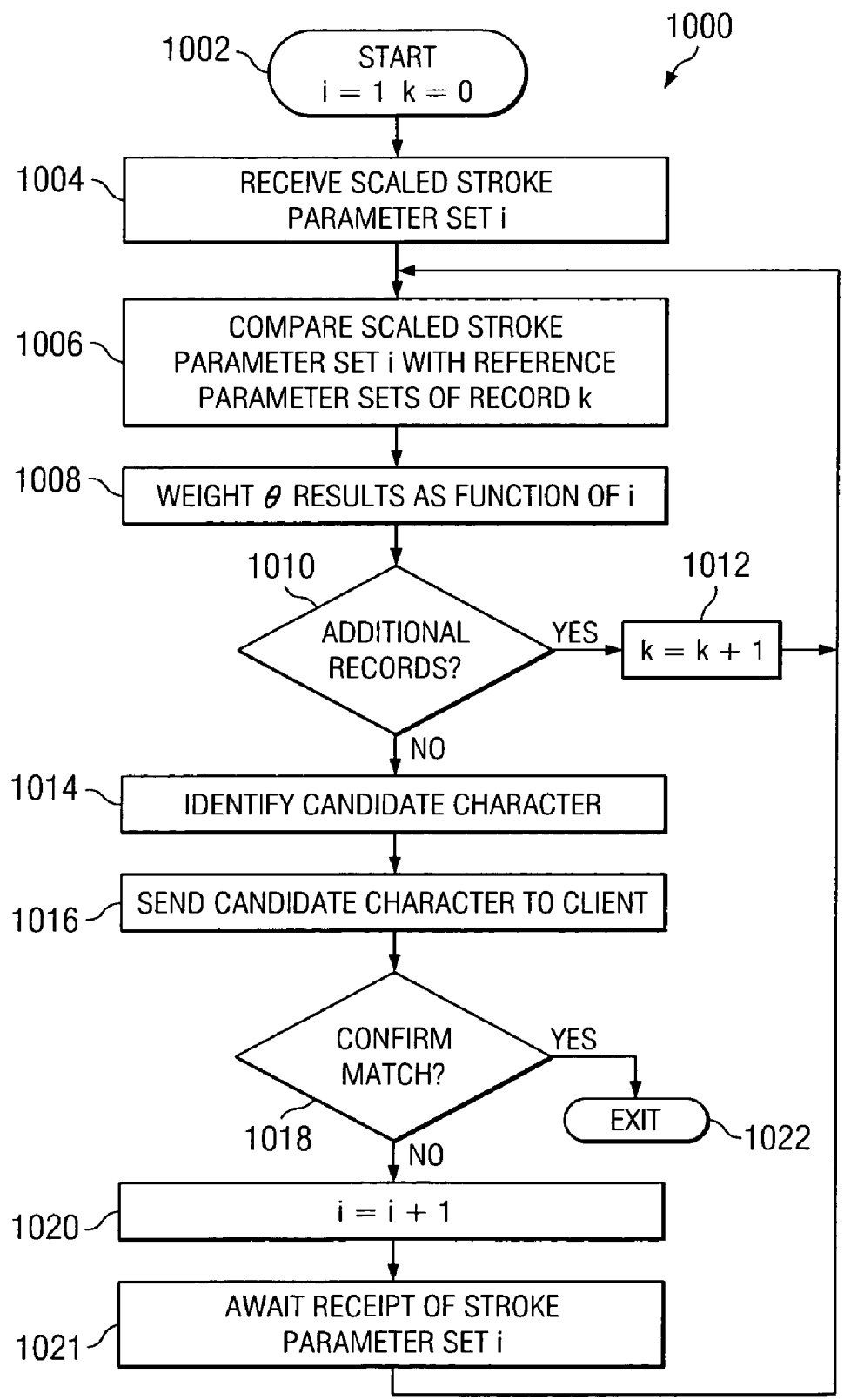
FIG. 14 is a flowchart that shows server-side handwriting recognition processing performed in accordance with a preferred embodiment of the present invention.

With reference now to FIG. 14, flowchart 1000 shows server-side handwriting recognition processing performed by data processing system 200 for interrogating reference character dictionary 700 in accordance with a preferred embodiment of the present invention. The handwriting recognition algorithm is invoked. A stroke counter i is initialized to one, and a record index counter k is initialized to zero (step 1002). A scaled stroke parameter set i is received from the client (step 1004) and is compared with reference parameter sets of record k of reference character dictionary 700 (step 1006). The results of comparisons between the stroke angle parameter of stroke parameter set i and reference angle parameter(s) of record k are weighted as a function of the stroke number, that is as a function of i (step 1008).

Preferably, results of comparisons made between the stroke angle parameter and reference angle parameters are most heavily weighted for an initial stroke parameter set and are then reduced for subsequent stroke parameter set comparisons. The advantage of weighting the comparison results of the stroke angle parameter and reference angle parameters for the earliest entered strokes of the handwritten character is gained due to the stroke angle parameter providing an accurate stroke attribute measure regardless of the input size of the stroke supplied by the user. It is preferable that the weight of the angle parameter comparison in determining a candidate character is reduced for one or more subsequent strokes after an initial stroke parameter set comparison.

The handwriting recognition algorithm then proceeds to evaluate whether additional records remain in reference character dictionary 700 for comparison with the current stroke parameter set i (step 1010). If additional records remain for comparison with the current stroke parameter set i, the record index counter k is incremented (step 1012) and processing returns to step 1006 for comparison of the stroke parameter set i with the next reference character dictionary record. Alternatively, the handwriting recognition algorithm proceeds to identify a candidate character based on results of the comparisons between the stroke parameter set i and reference parameter sets of the reference character dictionary records (step 1014). The candidate character is then sent to the client (step 1016) and an evaluation of whether a match between the candidate character and the character being entered at the client is made (step 1018). If a match is not confirmed, the handwriting recognition algorithm proceeds to increment the stroke counter i (step 1020) and awaits receipt of the next stroke parameter set (step 1021). Alternatively, the handwriting recognition algorithm exits (step 1022).

As described, the present invention provides a methodology and computer program product for scaling a handwritten character stroke parameter according to an input area in which a handwritten character stroke is supplied. A stroke length parameter and an input area are calculated from a detected handwritten character stroke start point and end point. The stroke length parameter is scaled according to the input area and a reference area that provides a relational measure of a reference character size from which reference character parameters are derived. The scaled stroke length parameter is supplied to a handwriting recognition algorithm and is used for identifying candidate characters that may match a character being input at a client. Comparison results between the stroke parameters and reference parameters of a reference character dictionary are thus improved.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for scaling handwritten character input for performing handwriting recognition, the method comprising the computer implemented steps of:
    deriving a first stroke parameter from a first handwritten character stroke;
    calculating an input area in which the first handwritten character stroke was supplied; and
    scaling the first stroke parameter according to the input area, wherein scaling comprises multiplying the first stroke parameter with a ratio of a reference area to the input area.

2. The method of claim 1, wherein the step of deriving includes:
    detecting a first start point and first end point of the first handwritten character stroke.

3. The method of claim 1, wherein the first input area bounds the first handwritten character stroke at a first coordinate extrema of the first handwritten character stroke.

4. The method of claim 1, wherein the step of deriving includes:

calculating a first length parameter of the first handwritten character stroke.

5. The method of claim 4, wherein the step of calculating includes:
squaring the first length parameter of the first handwritten character stroke.

6. The method of claim 1, further including:
determining first coordinates of a first start point and first end point of the first handwritten character stroke;
determining second coordinates of a second start point and a second end point of a second handwritten character stroke, wherein the step of calculating includes identifying first coordinate extrema of the first coordinates of the first handwritten character stroke and second coordinate extrema of the second coordinates second handwritten character stroke.

7. A computer program product in a recordable-type medium for scaling a parameter derived from a handwritten character stroke, the computer program product comprising:
first instructions for determining a first start point and a first end point of a first stroke input into a computer interface, responsive to determination of the first start point and the first end point, calculating a first stroke length parameter of the first stroke; and
second instructions for calculating an input area in which the first stroke was supplied and, responsive to calculating the input area, scaling the first stroke length parameter of the first stroke according to the input area, wherein scaling comprises multiplying the first stroke length parameter with a ratio of a reference area to the input area.

8. The computer program product of claim 7, wherein the input area bounds the first stroke at first coordinate extrema of the first stroke.

9. The computer program product of claim 7, wherein the second instructions scale the first stroke length parameter of the first stroke as a ratio of a reference area to the input area.

10. The computer program product of claim 7, wherein the first instructions further determine a second start point and a second end point of a second stroke input into the computer interface, and responsive to determination of the second start point and the second end point; and wherein the second instructions, responsive to the first instructions determining a second start point and a second end point of a second stroke input into the computer interface, recalculate the input area to determine a recalculated input area.

11. The computer program product of claim 10, wherein the first instructions calculate a second stroke length parameter of the second stroke.

12. The computer program product of claim 11, wherein the second instructions rescale the second stroke length parameter of the second stroke according to the recalculated input area.

13. The computer program product of claim 10, wherein the recalculated input area bounds the first stroke and the second stroke at first coordinate extrema of the first stroke and second coordinate extrema of the second stroke.

14. The computer program product of claim 13, wherein the second instructions rescale the first stroke length parameter of the first stroke according to the recalculated input area.

15. A data processing system comprising:
a pointing device for receiving a first handwritten character stroke;
a memory that contains a set of instructions; and
a processing unit, responsive to an execution of the set of instructions, for determining a first start point and first end point of the first handwritten character stroke and calculating a first stroke length parameter from the first start point and the first end point and, responsive to determining the first start point and the first end point, for calculating an input area into which the first handwritten character stroke was supplied, wherein the first stroke length parameter is scaled according to the input area, wherein scaling comprises multiplying the first stroke length parameter with a ratio of a reference area to the input area.

16. The data processing system of claim 15, wherein the input area bounds the first handwritten character stroke at first coordinate extrema of the first handwritten character stroke.

17. The data processing system of claim 15, wherein the processing unit, responsive to determining a second start point and second end point of a second handwritten character stroke, recalculates the input area to determine a recalculated input area, wherein the recalculated input area bounds the first handwritten stroke and the second handwritten stroke at first coordinate extrema of the first handwritten character stroke and at second coordinate extrema of the second handwritten character stroke.

18. The data processing system of claim 17, wherein the processing unit, responsive to recalculating the input area, rescales the first stroke length parameter.

19. The data processing system of claim 17, wherein the processing unit, responsive to determining the second start point and the second end point of the second handwritten character stroke, calculates a second stroke length parameter of the second handwritten character stroke and scales the second stroke length parameter of the second handwritten character stroke in relation to the recalculated input area.

20. A computer program product in a recordable-type medium for scaling a parameter derived from a handwritten character stroke, the computer program product comprising:
first instructions for displaying a collection area in a computer interface adapted to display a first stroke input into the collection area;
second instructions for calculating an input area in which the first stroke was supplied and, responsive to calculating the input area, scaling the stroke according to the input area, wherein scaling comprises multiplying the first stroke with a ratio of a reference area to the input area; and
third instructions for displaying the scaled stroke in a window of the computer interface.

21. The computer program product of claim 20, wherein the window is a predefined area of the computer interface.

22. The computer program product of claim 20, wherein the first instructions display a second stroke input in the collection area, the second instructions, responsive to input of the second stroke, recalculate the input area to determine a recalculated input area, scale the second stroke according to the recalculated input area to form a scaled second stroke, and rescale the first stroke according to the recalculated input area to form a rescaled first stroke.

23. The computer program product of claim 22, wherein the third instructions display the rescaled first stroke and the scaled second stroke in the window.

* * * * *